G. O. EATON.
RAILWAY CAR-TRUCK.

No. 179,774.

Patented July 11, 1876.

WITNESSES:
U. W. Hollingsworth
Colon A Kenow

INVENTOR:
Geo. O. Eaton
BY
ATTORNEYS.

UNITED STATES PATENT OFFICE.

GEORGE O. EATON, OF WARREN, MAINE.

IMPROVEMENT IN RAILWAY-CAR TRUCKS.

Specification forming part of Letters Patent No. 179,774, dated July 11, 1876; application filed May 24, 1876.

*To all whom it may concern:*

Be it known that I, GEO. O. EATON, of Warren, in the county of Knox and State of Maine, have invented a new and Improved Car-Truck; and I do hereby declare that the following is a full, clear, and exact description of the same.

The invention is an improvement in the class of trucks adapted to run on both broad and narrow gage tracks, and which are made adjustable in width to adapt them for such function.

The invention relates to connecting two wheeled frames by means of a single cross-timber and making them adjustable thereon, the arrangement being such that all other connecting devices are unnecessary, and accordingly dispensed with. The invention further relates to the means for coupling the wheeled frames, the same being adapted to be readily detached or adjusted to facilitate changing the gage of the trucks, as hereinafter described.

Figure 1:
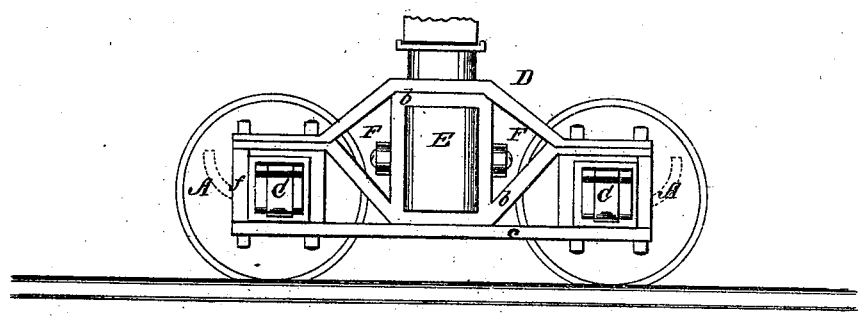
Figure 2:
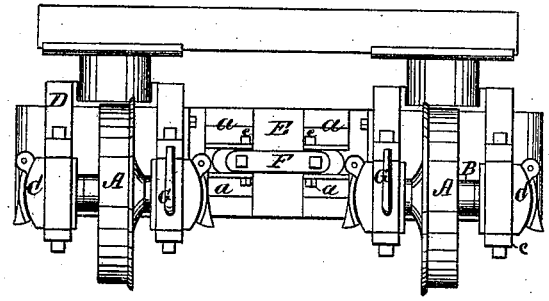
Figure 3:
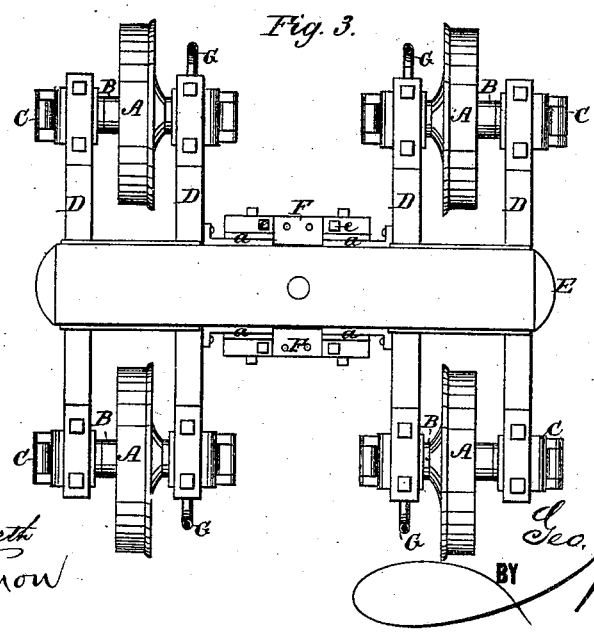

Referring to accompanying drawing, forming part of this specification, Figure 1 is a side elevation, Fig. 2 an end elevation, and Fig. 3 a plan view, of my improved truck.

Each wheel A is mounted on a short independent axle, B, having its bearings in boxes C, which are suitably secured between the pedestals of frames D. Said frames D are four in number, and rigidly connected in pairs by means of flanged plates a, or other suitable devices attached to the middle portions thereof, end cross-bars, ties, or other form of connection being entirely dispensed with. As shown, these frames D are, in the main, constructed after the ordinary plan—to wit, of an angular truck-iron, b, and bottom brace-bar c; but the former are provided with a socket adapted to receive the ends of the large cross-timber E, which forms the main connection between the two sets of frames D, and upon which they are adjusted toward or from each other. The pairs of frames are held rigidly connected by means of flanged plates a and coupling-bar F. The plates extend inward from the inner frames D, and lie parallel to each other at the same distance apart as the width of the timber E. They hence bear against the side of the timber E, and assist in holding the two sets of frames D rigidly parallel to each other, and at right angles to the timber E. The coupling-bar F has a number of holes in its ends, and is, hence, adapted to be connected to the flanged plates a by means of bolts e, which pass vertically through it, and to permit adjustment of the two sets of frames laterally as required, to adapt the truck for different-gage tracks.

One method which I propose for effecting this adjustment is as follows: Suppose it be desired to run a car provided with my form of truck from a broad to a narrow gage track. In such case the two lines of tracks may be connected by another, the rails of which are laid at the slight angle to each other required to enable the broad gage to gradually approximate and finally become a narrow gage within a distance of, say, one hundred yards.

The coupling-bars E being removed from the trucks, the cars may then be run slowly over the connecting-track of the two lines of railroad, and the pressure of the rails against the flanges of the wheels will cause the planes D to slide on the timber E and move toward each other till the cars pass onto the narrow gage, when the coupling-bars F will of course be replaced.

Instead of this plan it is practicable to jack up the cars, and thus make the required adjustment of the frames D to adapt them to run on a different gage.

In any case it is evident that little time need be consumed in changing from one track to another; and while my improved truck is a practical substitute for two trucks of different gage, its cost is but little more, and it may be adjusted from one gage to another in much less time than one truck can be changed for another.

As previously stated, I am enabled to dispense with the cross-bar heretofore employed to connect the truck-frames across the ends. I thus effect an economy in the construction of the truck, not only in respect to said bar, but by reason of the frames D being made shorter than would be otherwise practicable. Another advantage of this construction is, that the wheels A may be readily removed or drawn out from the ends of the truck-frames D by simply jacking up the latter and drawing the bolts that confine the side bar $f$ of the pedestals to allow the bar to be detached.

The bearings of the inner wheels of the truck may be lubricated by means of a conducting-tube, G, which extends upward therefrom, so that the nozzle of the oiler may be conveniently inserted in the mouth of the same, thus saving the labor of crawling under the truck and around the wheel, as would be otherwise requisite to be done. The tube G may be screwed into the box, or attached in any other suitable manner.

What I claim is—

1. The combination, with the wheeled frames supported upon short independent axles, of the central cross-timber E, the said frames being adjustable thereon, and connected and braced thereby, substantially as shown and described.

2. The combination, with the flanged plates, the pairs of rigidly-connected wheeled frames D, and the central cross-timber, of a coupling-bar adapted to form an adjustable connection between the frames, substantially as shown and described, for the purpose specified.

The above specification of my invention signed by me this 22d day of May, 1876.

GEO. O. EATON.

Witnesses:
SOLON C. KEMON,
CHAS. A. PETTIT.